US009139466B2

(12) United States Patent
Hirano et al.

(10) Patent No.: US 9,139,466 B2
(45) Date of Patent: Sep. 22, 2015

(54) OPTICAL FIBER PREFORM, OPTICAL FIBER, AND METHOD OF MANUFACTURING OPTICAL FIBER PREFORM

(75) Inventors: Masaaki Hirano, Yokohama (JP); Tetsuya Haruna, Yokohama (JP); Yoshiaki Tamura, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 230 days.

(21) Appl. No.: 13/352,644

(22) Filed: Jan. 18, 2012

(65) Prior Publication Data

US 2012/0189262 A1     Jul. 26, 2012

Related U.S. Application Data

(60) Provisional application No. 61/501,961, filed on Jun. 28, 2011.

(30) Foreign Application Priority Data

Jan. 20, 2011   (JP) ................. 2011-009823
Jun. 21, 2011   (JP) ................. 2011-137372

(51) Int. Cl.
  *G02B 6/00* (2006.01)
  *C03B 37/018* (2006.01)

(52) U.S. Cl.
  CPC ..... *C03B 37/01807* (2013.01); *C03B 37/01853* (2013.01); *C03B 2201/07* (2013.01);
  (Continued)

(58) Field of Classification Search
  USPC .................. 385/126, 127, 142, 144; 428/379; 65/397, 419, 435
  See application file for complete search history.

(56) References Cited

U.S. PATENT DOCUMENTS 3,971,645 A      7/1976 Bachmann et al.
5,146,534 A *    9/1992 Lines ............................ 385/142
(Continued)

FOREIGN PATENT DOCUMENTS

JP     03-232732 A      10/1991
JP     2001-089160 A    4/2001
(Continued)

OTHER PUBLICATIONS

Koichi Kajihara et al., "Surface Dissolution and Diffusion of Oxygen Molecules in $SiO_2$ Glass," Journal of the Ceramic Society of Japan, 2004, pp. 559-562, vol. 112 [10].

*Primary Examiner* — Daniel Petkovsek
(74) *Attorney, Agent, or Firm* — Drinker Biddle & Reath LLP

(57) ABSTRACT

An optical fiber preform includes a core portion, in which the core portion includes an alkali-metal-doped core glass portion doped with an alkali metal, the maximum concentration of oxygen molecules in the core portion is 30 mol ppb or more, and the average concentration of the alkali metal in the core portion is 5 atomic ppm or more. A method of manufacturing an optical fiber preform includes an alkali-metal-doping step of doping a pipe composed of silica-based glass with an alkali metal, an oxygen-molecule-doping step of doping the glass pipe with oxygen molecules, and a collapsing step of collapsing the glass pipe by heating the glass pipe, in which the optical fiber preform is manufactured.

10 Claims, 6 Drawing Sheets

(52) U.S. Cl.
CPC ......... *C03B2201/12* (2013.01); *C03B 2201/20* (2013.01); *C03B 2201/50* (2013.01); *Y10T 428/294* (2015.01)

(56) References Cited

U.S. PATENT DOCUMENTS

| | | |
|---|---|---|
| 6,153,546 A | 11/2000 | Saitoh et al. |
| 7,088,900 B1 | 8/2006 | Mishra |
| 7,469,559 B2 | 12/2008 | Ball et al. |
| 7,489,850 B1 | 2/2009 | Berkey |
| 7,524,780 B2 | 4/2009 | Ball et al. |
| 7,536,076 B2 | 5/2009 | Khrapko et al. |
| 8,798,412 B2 * | 8/2014 | Bookbinder et al. ........... 385/31 |
| 2004/0057692 A1 | 3/2004 | Ball et al. |
| 2005/0063663 A1 | 3/2005 | Anderson et al. |
| 2005/0129376 A1 * | 6/2005 | Hanson et al. ................. 385/123 |
| 2005/0144986 A1 | 7/2005 | Bookbinder et al. |
| 2006/0130530 A1 | 6/2006 | Anderson et al. |
| 2008/0050086 A1 | 2/2008 | Bickham et al. |
| 2012/0263427 A1 * | 10/2012 | Hirano et al. ................. 385/142 |

FOREIGN PATENT DOCUMENTS

| | | |
|---|---|---|
| JP | 2006-342033 A | 12/2006 |
| JP | 2007-504080 | 3/2007 |
| JP | 2007-513862 A | 5/2007 |
| JP | 2007-137706 | 6/2007 |
| WO | WO 2005/058765 A1 | 6/2005 |

\* cited by examiner

OPTICAL FIBER PREFORM, OPTICAL FIBER, AND METHOD OF MANUFACTURING OPTICAL FIBER PREFORM

This application claims the benefit of U.S. Provisional Application No. 61/501,961, filed Jun. 28, 2011, which is incorporated by reference herein in its entirety.

BACKGROUND OF THE INVENTION

1. Field of the Invention

The present invention relates to an optical fiber preform, an optical fiber, and a method of manufacturing an optical fiber preform.

2. Description of the Related Art

An optical fiber composed of silica-based glass and having a core region doped with an alkali metal is known (refer to Japanese Unexamined Patent Application Publication (Translation of PCT Application) No. 2007-504080 and U.S. Patent Application Publication No. 2006/0130530). In the case where a core portion of an optical fiber preform is doped with an alkali metal, it is possible to reduce the viscosity of the core portion during drawing of the optical fiber preform, as compared with the case where the core portion is not doped with an alkali metal. Thus, relaxation of a network structure of silica glass can be made to enhance. It is believed that, consequently, an attenuation of the resulting optical fiber manufactured by drawing can be reduced.

A known method of doping silica glass with an alkali metal is a diffusion method. In the diffusion method, a glass pipe composed of silica-based glass is heated by an external heat source or non-equilibrium plasma is generated in the glass pipe while vapor of a raw material such as an alkali metal or an alkali metal salt is introduced into the glass pipe, thereby doping an inner surface of the glass pipe with an alkali metal element by diffusion.

After the glass pipe is doped with an alkali metal by the diffusion method, the glass pipe is heated to reduce the diameter thereof. After the reduction of the diameter, in order to remove impurity, such as Ni, Fe, and other transition metals, which were also doped to the glass pipe at the same time as the doping of the alkali metal element, the inner surface of the glass pipe is etched by a certain amount in the direction of the wall thickness. The diffusion rates of alkali metals are higher than those of transition metals. Therefore, even when the transition metals are removed by etching a surface of glass by a certain amount in the thickness direction thereof, the most of doped alkali metals can remain in the glass. After the etching, the glass pipe is made to collapse by heating to manufacture an alkali-metal-doped core rod. A cladding portion is synthesized on the alkali-metal-doped core rod to manufacture an optical fiber preform. Subsequently, the optical fiber preform is drawn to manufacture an optical fiber.

SUMMARY OF THE INVENTION

An object of the present invention is to provide an optical fiber preform with which an optical fiber having a core region doped with one or more alkali metals and having a low attenuation can be manufactured with a high yield. Another object of the present invention is to provide a method of manufacturing such an optical fiber preform. A still another object of the present invention is to provide an optical fiber having a core region doped with one or more alkali metals and having a low attenuation.

To achieve the above objects, according to a first embodiment of the present invention, there is provided an optical fiber preform composed of silica-based glass, the optical fiber preform including a core portion to be formed into a core region of an optical fiber by drawing, wherein the core portion includes an alkali-metal-doped core glass portion doped with one or more alkali metals, the maximum concentration of oxygen molecules in the core portion is 30 mol ppb or more, and the average concentration of alkali metal in the core portion is 5 atomic ppm or more. The average concentration of the alkali metal means a ratio of the sum of the numbers of atoms of all alkali metals doped in the core portion.

In the optical fiber preform, the alkali-metal-doped core glass portion preferably further contains oxygen molecules and a halogen in addition to a $SiO_2$ glass network, and the average concentration of each of other dopants in the alkali-metal-doped core glass portion is preferably lower than the average concentration of each of the alkali metal and the halogen in the alkali-metal-doped core glass portion. More preferably, the maximum concentration of each of the other dopants in the alkali-metal-doped core glass portion is lower than the maximum concentration of each of the alkali metal, the oxygen molecules, and the halogen in the alkali-metal-doped core glass portion.

Preferably, the optical fiber preform further includes a cladding portion to be formed into a cladding region of the optical fiber by drawing, the cladding portion being disposed on the periphery of the core portion, wherein the cladding portion is a silica based glass doped with fluorine. The alkali-metal-doped core glass portion may be doped with sodium, potassium, rubidium, cesium, or a mixture there of and is preferably doped with potassium as the one or more alkali metals. The core portion preferably includes a first core glass portion doped with the one or more alkali metals in an average concentration of 5 atomic ppm or more, and a second core glass portion containing the one or more alkali metals in an amount of 1 atomic ppm or less, the second core glass portion being disposed on the outer periphery of the first core glass portion. The maximum concentration of oxygen molecules in the alkali-metal-doped core glass portion is preferably 160 mol ppb or less. The average concentration of the alkali metal in the core portion is preferably 120 atomic ppm or less.

According to a second embodiment of the present invention, there is provided an optical fiber manufactured by drawing an optical fiber preform according to an embodiment of the present invention, wherein an attenuation at a wavelength of 1,550 nm is 0.180 dB/km or less, preferably 0.170 dB/km or less, and more preferably 0.165 dB/km or less.

According to a third embodiment of the present invention, there is provided a method of manufacturing an optical fiber preform composed of silica-based glass and including a core portion to be formed into a core region of an optical fiber by drawing, the method including an alkali-metal-doping step of doping a glass pipe composed of silica-based glass with one or more alkali metals by heating the glass pipe while supplying source gas of the one or more alkali metal to the inside of the glass pipe, an oxygen-molecule-doping step of doping the glass pipe with oxygen molecules by heating the glass pipe while supplying oxygen gas to the inside of the glass pipe, and a collapsing step of collapsing the glass pipe by heating the glass pipe after the alkali-metal-doping step and the oxygen-molecule-doping step, wherein the optical fiber preform according to an embodiment of the present invention is manufactured. In the collapsing step of the method of manufacturing an optical fiber preform according to the third embodiment of the present invention, the partial pressure of the oxygen gas in the glass pipe is preferably controlled to be 80 kPa or more.

According to the present invention, it is possible to manufacture an optical fiber having a core region doped with an alkali metal and having a low attenuation with a high yield.

DESCRIPTION OF THE PREFERRED EMBODIMENTS

Figure 1:
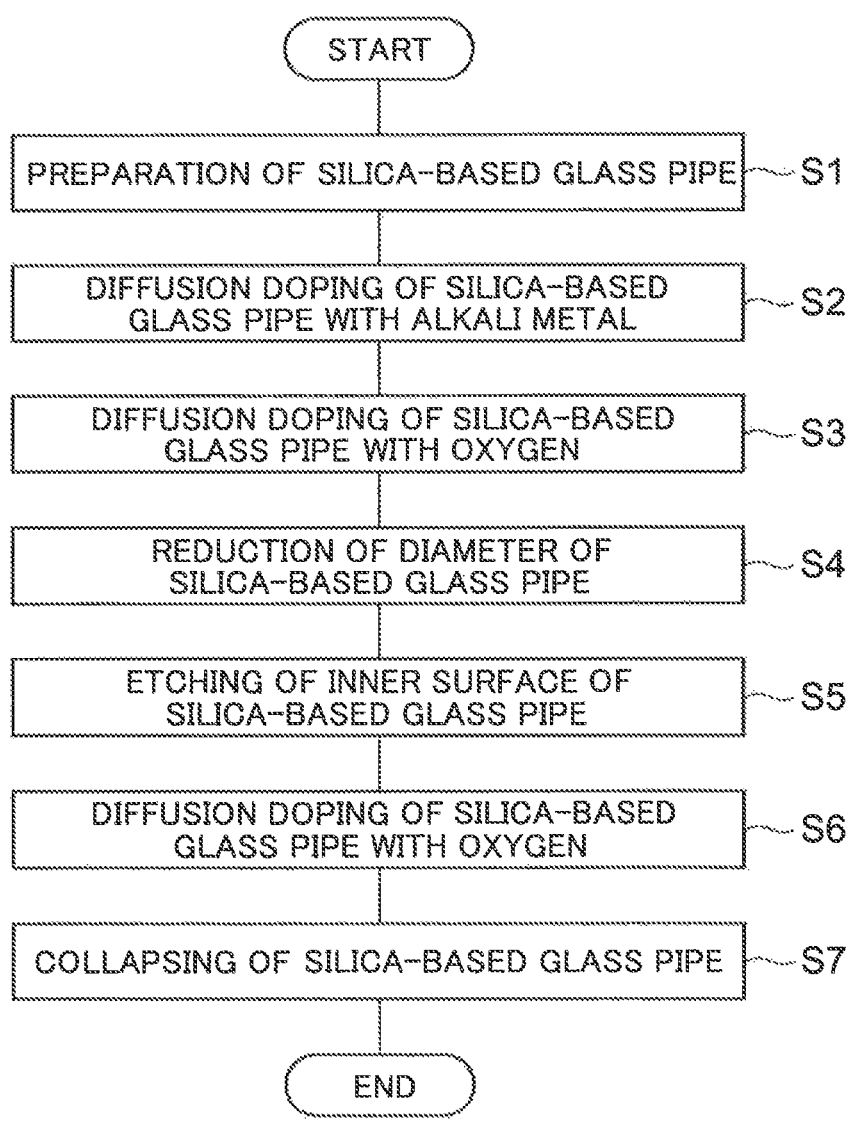
FIG. 1 is a flowchart of a method of manufacturing an optical fiber preform according to an embodiment of the present invention.

Embodiments of the present invention will now be described with reference to the drawings. The drawings are illustrative only, and do not limit the scope of the invention. In the drawings, in order to avoid overlapping of description, the same symbols represent the same portions. The proportions of dimensions in the drawings are not necessarily accurate.

In the course of studies on an optical fiber composed of silica-based glass and having a core region doped with an alkali metal, the inventor of the present invention found that, even in an optical fiber composed of silica-based glass and having a core region doped with an alkali metal, the attenuation of the optical fiber is high in some cases, and that the production yield of optical fibers having a low attenuation is low. In addition, it is known that, in general, when the concentration of dissolved oxygen molecules in an optical fiber preform is high, the attenuation of the resulting optical fiber becomes high (refer to U.S. Patent Application Publication No. 2006/0130530 and Japanese Unexamined Patent Application Publication No. 2007-137706). However, the inventor of the present invention found that, in such an optical fiber composed of silica-based glass and having a core region doped with an alkali metal, when the concentration of oxygen molecules in the core region is higher than a certain value, the attenuation decreases. Herein, the term "dissolved oxygen molecules" refers to oxygen molecules present in the form of $O_2$ in a network-structure of silica glass. Although the reasons why these phenomena occur are not exactly clear, it is believed that this is because dissolved oxygen molecules and the alkali metal react with each other and are taken in the $SiO_2$ glass network, thus preventing the generation of glass defects. The present invention is based on this finding made by the inventor of the present invention.

FIG. 1 is a flowchart of a method of manufacturing an optical fiber preform according to an embodiment of the present invention. According to the method of manufacturing an optical fiber preform of this embodiment, an optical fiber preform of the present invention can be manufactured by sequentially performing processes of steps S1 to S7 described below.

In step S1, a glass pipe composed of silica-based glass is prepared. This glass pipe is preferably a pure silica glass. However, the glass pipe may contain halogens inevitably doped in a manufacturing process thereof in an amount of several tens to several thousands atomic ppm, and the content of other components such as an OH group and transition metals is preferably 10 ppb or less. This glass pipe is formed into a core region (or a part of a core region) of an optical fiber.

Figure 2:
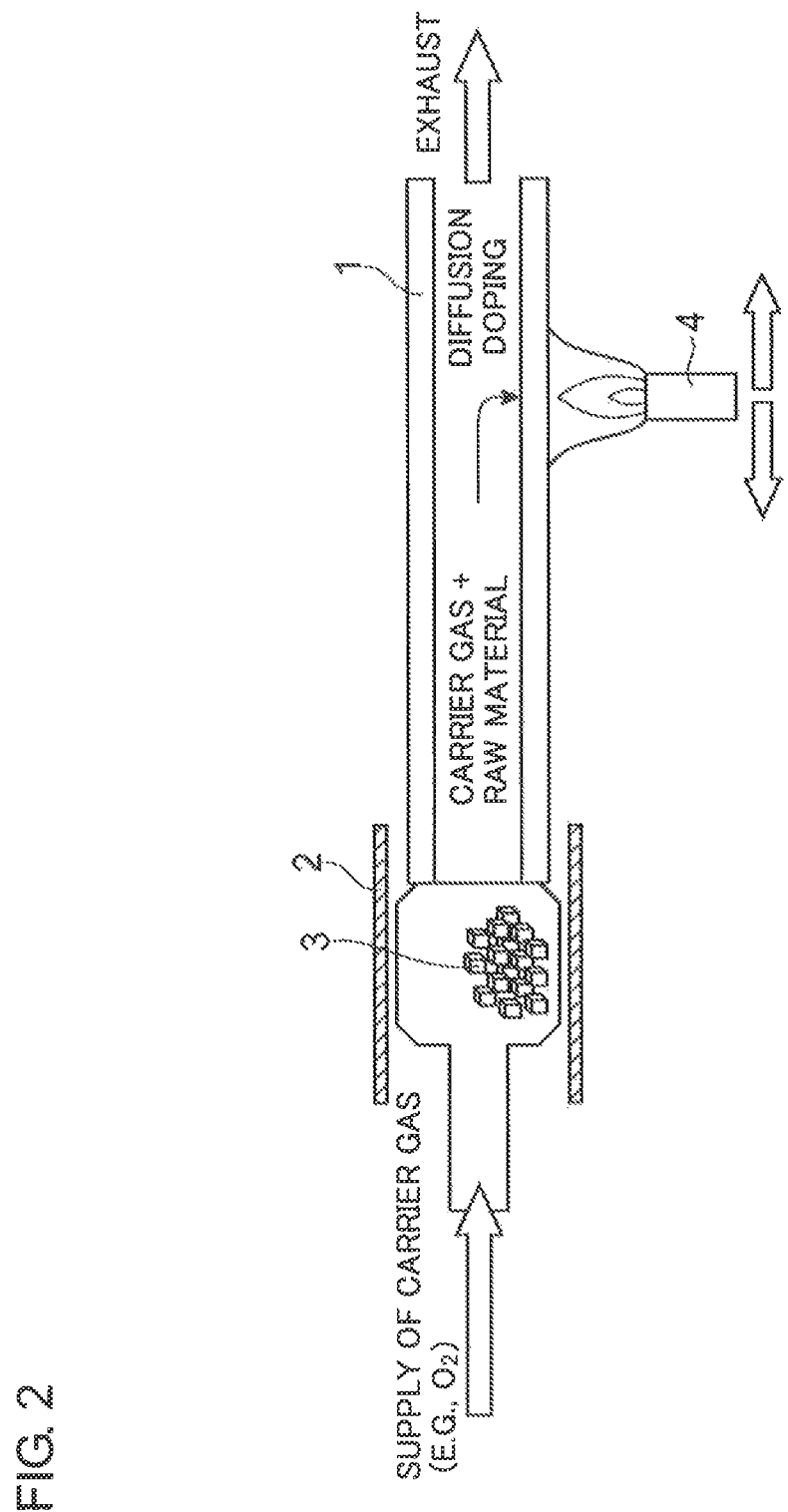
FIG. 2 is a conceptual view illustrating an alkali-metal-doping step in the method of manufacturing an optical fiber preform according to an embodiment of the present invention.

Step S2 is an alkali-metal-doping step of doping the glass pipe with an alkali metal. FIG. 2 is a conceptual view illustrating the alkali-metal-doping step S2 in the method of manufacturing an optical fiber preform according to an embodiment of the present invention. In step S2, a gas of a raw material 3 for an alkali metal heated by a heat source (such as an electric furnace or a burner) 2 is supplied to the inside of a glass pipe 1 together with a carrier gas (such as $O_2$ gas, Ar gas, He gas, or a mixture there of) supplied from a supply source (not shown). At the same time, the glass pipe 1 is heated by an external heat source (such as a thermal plasma or an oxyhydrogen flame) 4. Thus, the glass pipe 1 is doped with the alkali metal by diffusion from the inner surface thereof.

Steps S3 and S6 are each an oxygen-molecule-doping step of doping the inner surface of the glass pipe with oxygen molecules, the glass pipe having been doped with the alkali metal. In steps S3 and S6, the glass pipe is doped with oxygen molecules from the inner surface thereof by supplying oxygen gas supplied from a supply source (not shown) to the inside of the glass pipe and heating the glass pipe.

Step S4 is a diameter-reducing step of reducing the diameter of the glass pipe by heating. Note that steps S3 and S4 may be performed at the same time. In step S5, the inner surface of the glass pipe is etched so as to remove impurities, such as Ni, Fe, and other transition metals which are doped to the glass pipe at the same time as the doping of the alkali metal element. Step S7 is a collapsing step of collapsing the glass pipe by heating. An alkali-metal-doped core glass rod can be manufactured through the above steps. In the collapsing step, the partial pressure of oxygen gas in the glass pipe may be controlled to be 80 kPa or more, preferably, 90 kPa or more and 100 kPa or less. In this case, a central portion of the alkali-metal-doped core glass rod can be efficiently doped with oxygen molecules.

A portion functioning as a part of the core region may be further provided on the periphery of the alkali-metal-doped core glass rod. Specifically, the core portion may include a first core glass portion (alkali-metal-doped core glass rod) doped with an alkali metal in an average concentration of 5 atomic ppm or more, and a second core glass portion containing an alkali metal in an amount of 1 atomic ppm or less, the second core glass portion being disposed on the outer periphery of the first core glass portion. It takes a long time to perform the alkali-metal-doping step in which silica-based glass is doped with an alkali metal from the inner surface thereof by diffusion, and thus the cost of this step is high. On the other hand, the costs of manufacturing of an optical fiber preform and an optical fiber can be reduced by providing ordinary core glass, which hardly includes an alkali metal, on the periphery of the alkali-metal-doped core glass rod so as to increase the diameter of a core portion and the size thereof.

A cladding portion functioning as a cladding region of an optical fiber is provided on the periphery of the alkali-metal-doped core glass rod to manufacture an optical fiber preform. Furthermore, the optical fiber preform is drwn by a known method to manufacture an optical fiber.

Regarding the oxygen-molecule-doping steps of step S3 and step S6, both steps S3 and S6 may be performed or only one of the steps S3 and S6 may be performed. A diffusion coefficient of oxygen at a temperature of 1,500° C. is about $1 \times 10^{-7}$ [cm$^2$/s], which is about 1/10 of that of alkali metals and is substantially equal to those of transition metals such as Fe. Accordingly, as in step S6, the oxygen-molecule-doping step may be performed after the etching for removing transition metals mixed in the alkali-metal-doping step.

The alkali-metal-doped core glass rod preferably contains an alkali metal, oxygen molecules, and halogens in addition to a SiO$_2$ glass network. The average concentration of each of other dopants such as germanium, phosphorus, and transition metals in the core glass portion is preferably lower than the average concentration of each of the alkali metal and the halogens in the core glass portion. More preferably, the maximum concentration of each of the other dopants in the core glass portion is lower than the maximum concentration of each of the alkali metal, the oxygen molecules, and the halogens in the core glass portion. The cladding portion is preferably silica glass doped with F. Such an optical fiber having substantially pure silica core and a cladding doped with F is more preferable from the standpoint of reducing the attenuation of the optical fiber.

The alkali metal element doped to the pipe composed of silica-based glass is not particularly limited, but is preferably potassium. The reason for this is that since potassium has an ionic radius substantially comparable to the radius of an oxygen atom in the SiO$_2$ glass network, distortion of the SiO$_2$ glass network due to doping of potassium is relatively small, and the silica glass can be relatively easily doped with potassium.

Figure 3:
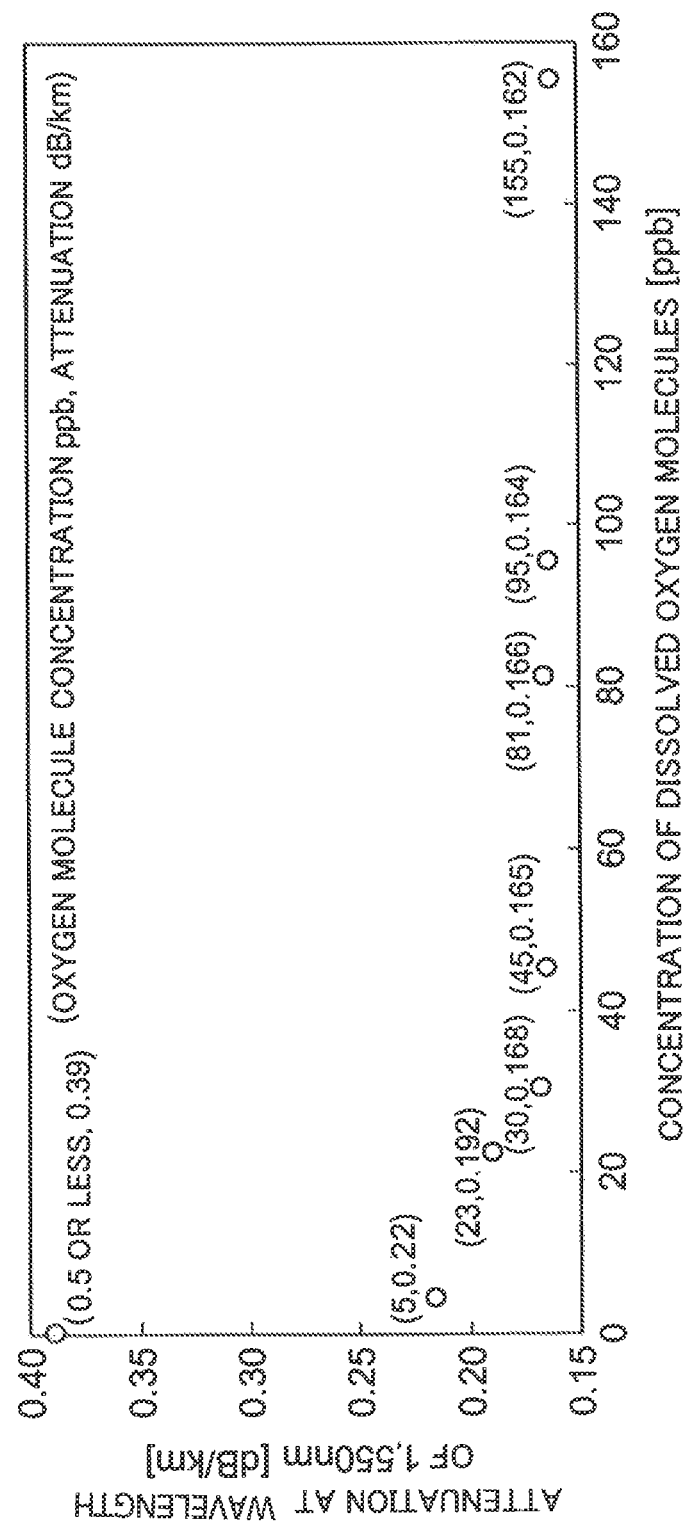
FIG. 3 is a graph showing a relationship between the maximum concentration of dissolved oxygen molecules in a core portion of an optical fiber preform, the core portion being doped with an alkali metal, and an attenuation of an optical fiber manufactured from the optical fiber preform at a wavelength of 1,550 nm.

FIG. 3 is a graph showing a relationship between the maximum concentration of dissolved oxygen molecules in a core portion of an optical fiber preform, the core portion being doped with an alkali metal, and an attenuation of an optical fiber manufactured from the optical fiber preform at a wavelength of 1,550 nm. The concentration of dissolved oxygen molecules was measured by the intensity of fluorescence at a wavelength of 1,272 nm at the time of irradiation of light having a wavelength of 765 nm (for example, refer to K. Kajihara, et al., J. Ceramic Soc. Japan, 112 [10], pp. 559-562 (2004)). In each of the optical fiber preforms, the alkali-metal-doped core glass rod was substantially composed of pure silica glass in which the peak concentration of potassium was about 500 atomic ppm, the average concentration of potassium was about 15 atomic ppm, and the concentration of dopants other than halogens such as Cl and F was 10 ppb or less. The cladding portion of each of the optical fiber preforms was composed of silica glass doped with F. The manufactured and evaluated optical fibers were each a single-mode fiber at a wavelength of 1,550 nm.

The two numerical values within parentheses near each plotted point denote the concentration of dissolved oxygen molecules [ppb] and an attenuation [dB/km] at a wavelength of 1,550 nm. As is apparent from the graph, when the maximum concentration of dissolved oxygen molecules in the alkali-metal-doped core glass rod was 30 mol ppb (or $7 \times 10^{-14}$ molecules/cm$^3$) or more, the attenuation of the optical fiber at a wavelength of 1,550 nm was 0.17 dB/km or less. This result shows that the maximum concentration of dissolved oxygen molecules in an alkali-metal-doped core glass rod is preferably 30 mol ppb or more.

Figure 4:
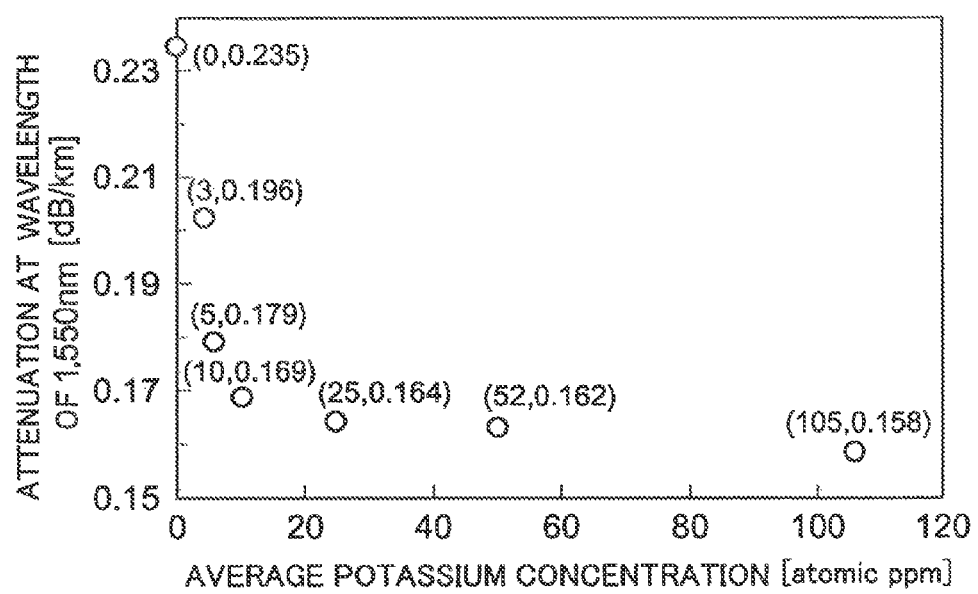
FIG. 4 is a graph showing a relationship between the average potassium concentration in a core portion of an optical fiber preform and an attenuation of an optical fiber manufactured from the optical fiber preform at a wavelength of 1,550 nm.

FIG. 4 is a graph showing a relationship between the average potassium concentration in a core portion of an optical fiber preform and an attenuation of an optical fiber manufactured from the optical fiber preform at a wavelength of 1,550 nm. In this experiment, optical fibers were manufactured using alkali-metal-doped core glass rods having various concentrations of potassium metal serving as an alkali metal and a maximum concentration of oxygen molecules of about 100 mol ppb. The alkali-metal-doped core glass rods were each substantially composed of pure silica glass having a concentration of 10 ppb or less of dopants other than halogens such as Cl and F. The cladding portion of each of the optical fiber preforms was composed of silica glass doped with F. The manufactured and evaluated optical fibers were each a single-mode fiber at a wavelength of 1,550 nm.

Figure 5:
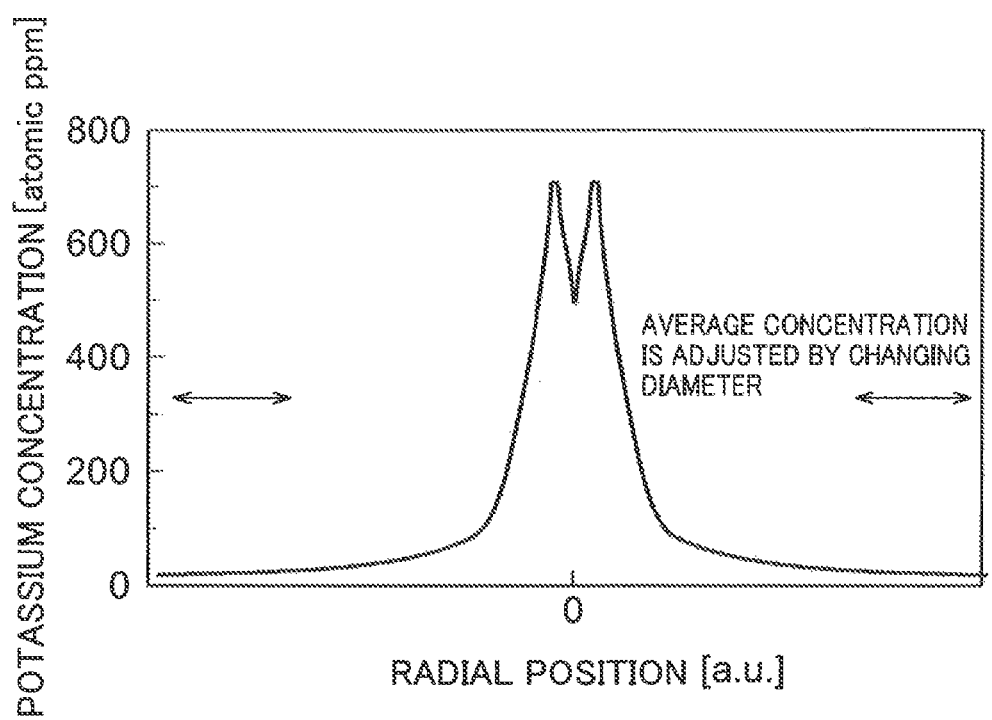
FIG. 5 is a graph showing a distribution of the concentration of potassium in alkali-metal-doped core glass rods of the optical fiber preforms whose average potassium concentrations are shown in FIG. 4.
Figure 6:
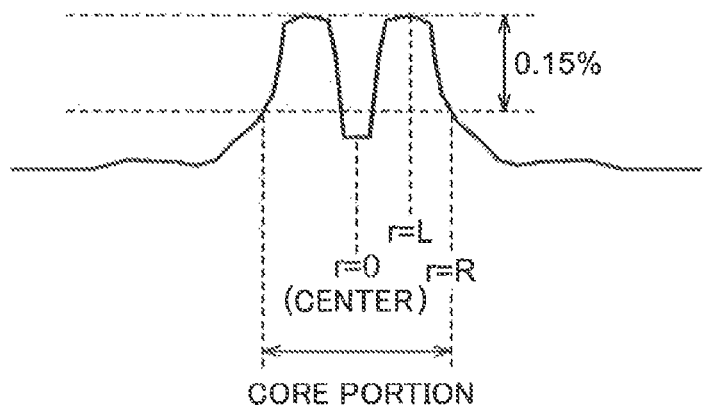
FIG. 6 is a graph showing a refractive index profile of an optical fiber preform.

FIG. 5 is a graph showing a distribution of the concentration of an alkali metal in alkali-metal-doped core glass rods of the optical fiber preforms whose average potassium concentrations are shown in FIG. 4. Regarding the alkali metal concentration in these alkali-metal-doped core glass rods, the peak value in a central portion is substantially uniform at about 700 atomic ppm, and the alkali metal concentration decreases with increasing distance from a position at which the concentration becomes the maximum, the position being located near the central axis. Consequently, the average concentration of the alkali metal in the core glass was adjusted by changing the diameter of the alkali-metal-doped core glass rod used in manufacturing the optical fiber preform. The average potassium concentration in the core portion was calculated as shown in FIG. 6, which is a graph showing a refractive index profile of an optical fiber preform. In FIG. 6, the area within the radius R is defined as the core portion, wherein the refractive index at a position spaced away from a central axis of an optical fiber preform by a distance r in the radial direction is represented by N(r), a position in the radial direction at which the refractive index N(r) becomes the maximum N$_{max}$ is represented by L, and a position at which (N$_{max}$-N(R))/N$_{max}$ is 0.15% and outside the position L in the radial direction is represented by R.

In FIG. 4, the two numerical values within parentheses near each plotted point denote the average potassium concentration [atomic ppm] and an attenuation [dB/km] at a wavelength of 1,550 nm. When the average alkali concentration in the core portion of an optical fiber preform is 5 atomic ppm or more, the attenuation of the optical fiber at a wavelength of 1,550 nm was 0.180 dB/km or less. Furthermore, when the average alkali concentration was 10 atomic ppm or more, the attenuation of the optical fiber at a wavelength of 1,550 nm was 0.170 dB/km or less. These results show that the average alkali concentration in the core portion of an optical fiber preform is preferably 5 atomic ppm or more, and more preferably 10 atomic ppm or more. It is believed that the reason why the attenuation of an optical fiber is high at a low concentration of alkali metal element of 5 atomic ppm or less is due to a known effect of dissolved oxygen molecules.

As is apparent from FIGS. 3 and 4, when the maximum concentration of oxygen molecules in the core portion of an optical fiber preform is 30 mol ppb or more and the average concentration of an alkali metal in the core portion is 5 atomic ppm or more, the attenuation of an optical fiber manufactured from the optical fiber preform at a wavelength of 1,550 nm can be made to 0.180 dB/km or less. Furthermore, the attenuation of an optical fiber at a wavelength of 1,550 nm can be made to 0.170 dB/km or less, more preferably 0.165 dB/km or less. These attenuations of the optical fibers are significantly lower than the attenuation of a standard single-mode optical fiber having a core portion composed of silica-based glass doped with $GeO_2$, the attenuation being about 0.19 dB/km. Thus, the use of these optical fibers as an optical transmission line can improve the performance of a long-distance transmission optical communication system.

Preferable ranges of other main transmission properties are described in Table below.

TABLE

|  | Preferable range | Example 1 | Example 2 | Example 3 |
|---|---|---|---|---|
| Attenuation @1300 nm dB/km | — | 0.285 | 0.290 | 0.270 |
| Attenuation @1380 nm dB/km | 0.8 or less | 0.283 | 0.305 | 0.40 |
| Attenuation @1550 nm dB/km | 0.180 | 0.157 | 0.164 | 0.154 |
| Zero-dispersion wavelength nm | 1250 to 1350 | 1300 | 1275 | 1308 |
| Wevelength dispersion @1550 nm ps/nm/km | +15 to +22 | +17.8 | +20.8 | +16.1 |
| Dispersion slope @1550 nm ps/nm$^2$/km | +0.05 to +0.07 | +0.055 | +0.059 | +0.055 |
| Dispersion slope @ Zero-dispersion wavelength ps/nm$^2$/km | — |  |  | +0.082 |
| Effective area @1310 nm μm$^2$ | — |  |  | 64 |
| Effective area @1550 nm μm$^2$ | 70 to 160 | 82 | 115 | 82 |
| Mode field diameter @1310 nm μm | — |  |  | 9.1 |
| Mode field diameter @1550 nm μm | — | 10.0 | 12.1 | 10.3 |
| Fiber cut-off wevelength nm | — | 1450 | 1500 | 1280 |
| Cable cut-off wavelength (measured using an optical fiber having a length of 22 m) nm | 1520 or less | 1380 | 1402 | 1230 |
| Polarization mode dispersion (C- and L-bands) ps/√km | 0.2 | 0.08 | 0.06 | 0.02 |
| Nonlinear coefficient @1550 nm (Random polarization state) (W · km)$^{-1}$ | — | 1.1 | 0.8 | 1.1 |

Note that the attenuation at a wavelength of 1,380 nm is more preferably 0.4 dB/km or less, and most preferably 0.3 dB/km or less. The cable cut-off wavelength is more preferably 1,450 nm, which is a pump wavelength used in Raman amplification, or less. Alternatively, the cable cut-off wavelength may be 1,260 nm or less as in a standard single-mode fiber.

Figure 7:
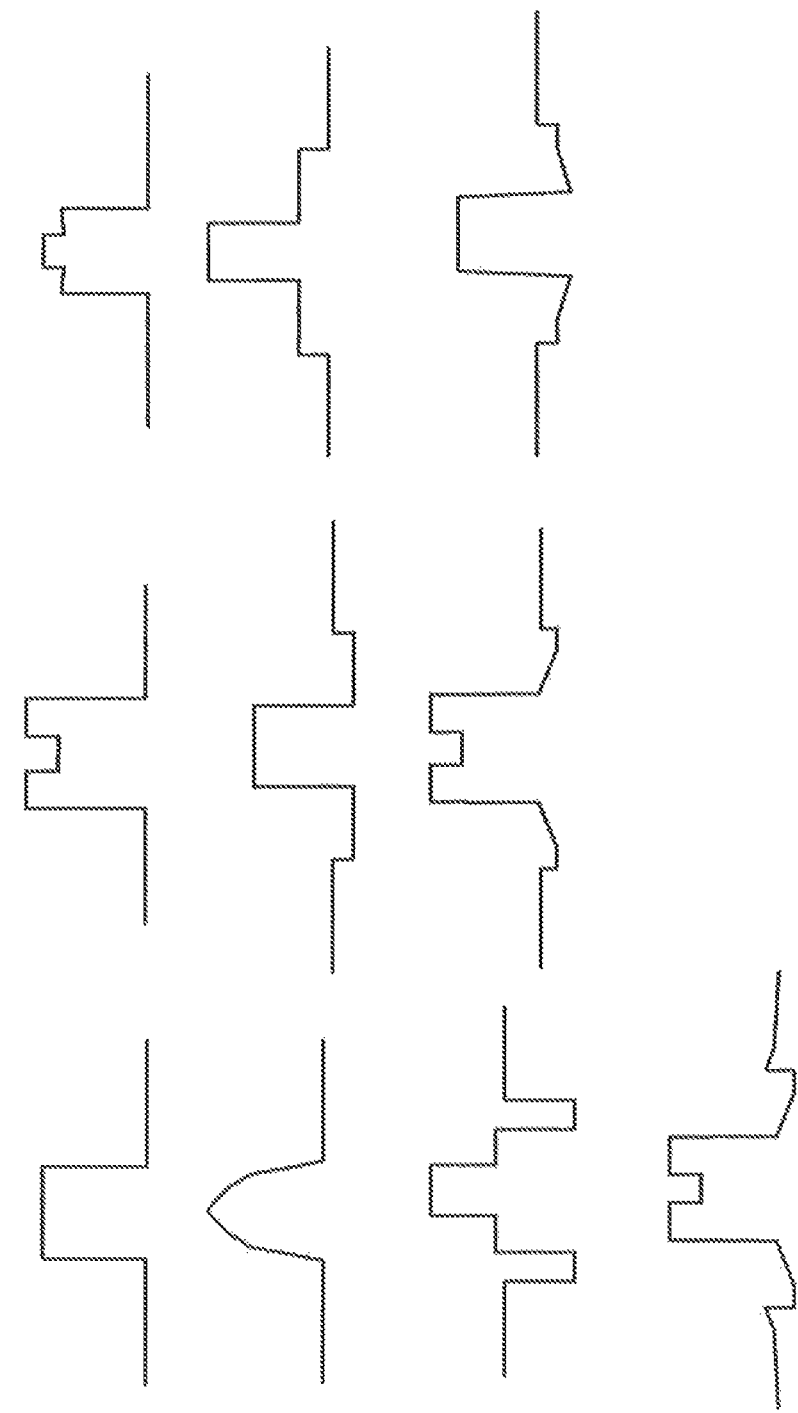
FIG. 7 includes other examples of a graph showing a refractive index profile of an optical fiber preform.

The diameter of the core portion of an optical fiber is about 5 to 15 μm. The relative refractive index difference between the core portion and the cladding portion is about 0.1% to 0.7%. The diameter of the outer circumference of the glass portion of the optical fiber may be about 110 to 150 μm. The diameter of the outer circumference of the optical fiber covered with a resin may be about 200 to 300 μm. Each of the optical fiber preform, the core portion of the optical fiber, and the cladding portion of the optical fiber may have a refractive index structure. The refractive index structure may be, for example, any of the profiles illustrated in FIG. 7, but is not limited thereto.

When the maximum concentration of oxygen molecules or the average concentration of an alkali metal in an alkali-metal-doped core glass portion is excessively large, the cost of raw materials increases and the process time required for doping becomes long, resulting in an increase in the manufacturing cost. Accordingly, from the standpoint of reducing the manufacturing cost, preferably, oxygen molecules or an alkali metal is not excessively doped in an amount exceeding an amount at which the attenuation of the optical fiber can be sufficiently reduced, the maximum concentration of oxygen molecules in the alkali-metal-doped core glass portion is preferably 160 mol ppb or less, and the average concentration of an alkali metal in the alkali-metal-doped core glass portion is preferably 120 atomic ppm or less.

Example 1

In Example 1, an optical fiber preform was manufactured by sequentially performing the processes of steps S1 to S7 in FIG. 1, and an optical fiber was further manufactured from the optical fiber preform. Transmission properties of the optical fiber were evaluated.

A glass pipe prepared in step S1 was composed of silica-based glass containing 50 atomic ppm of Cl and 5,000 atomic ppm of F as dopants, and the concentration of other impurities in the glass pipe was 10 atomic ppb or less. Thus, the glass pipe was substantially composed of pure silica glass. The outer diameter of this glass pipe was 35 mm, and the inner diameter thereof was about 20 mm.

In step S2, potassium bromide (KBr) was used as a raw material for an alkali metal, and this raw material was heated to a temperature of 800° C. by a heat source to generate KBr vapor. The glass pipe was then heated by a thermal plasma flame serving as an external heat source so that the temperature of the outer surface of the glass pipe became 2,050° C. while the KBr vapor was introduced into the glass pipe together with oxygen introduced as a carrier gas at a flow rate of 1 SLM (1 liter/min in terms of the standard state). Heating was performed by causing the thermal plasma flame to traverse at a rate of 30 mm/min for a total of 30 times. Thus, the inner surface of the glass pipe was doped with a potassium metal element by diffusion.

In step S3, the glass pipe doped with the potassium metal element was heated by a thermal plasma flame serving as an external heat source so that the temperature of the outer surface of the glass pipe became 2,100° C. while oxygen (2 SLM) was supplied through the glass pipe. Heating was performed by causing the thermal plasma flame to traverse at a rate of 40 mm/min for a total of 5 times. Thus, the inner surface of the glass pipe doped with the potassium metal element was doped with oxygen molecules by diffusion. Furthermore, step S4 was performed at the same time as step S3 to reduce the inner diameter of the glass pipe doped with the potassium metal element to 3 mm.

In step S5, gas-phase etching was performed by heating the glass pipe doped with the potassium metal element and oxygen molecules by an external heat source while $SF_6$ (0.05 SLM) and oxygen (1 SLM) were introduced into the glass pipe. Thus, the inner diameter of the glass pipe was made to 3.4 mm.

In step S6, the glass pipe was heated by a thermal plasma flame serving as an external heat source so that the temperature of the outer surface of the glass pipe became 2,100° C. while oxygen (2 SLM) was supplied through the glass pipe. Heating was performed by causing the thermal plasma flame to traverse at a rate of 40 mm/min for a total of 5 times. Thus, the inner surface of the glass pipe was doped with oxygen molecules by diffusion.

In step S7, the absolute pressure in the glass pipe was reduced to 1 kPa, while oxygen (1 SLM) was introduced into the glass pipe. The glass pipe was made to collapse by increasing the surface temperature of the glass pipe to 1,400° C. by an external heat source. Thus, an alkali-metal-doped core glass rod having a diameter of 28 mm was obtained. The maximum concentration of oxygen molecules in this core glass rod was 115 mol ppb, and the maximum potassium concentration therein was 1,200 atomic ppm.

In order to remove water and hydroxyl group and transition metals in the outer peripheral portion of the alkali-metal-doped core glass rod obtained by collapsing, the outer peripheral portion of the core glass rod was ground until the diameter of the core glass rod became 12 mm. Silica-based glass serving as outer core glass and doped with 5,000 atomic ppm of Cl was provided on the outside of the alkali-metal-doped core glass rod to form core glass having a diameter of 60 mm. Specifically, a core glass portion of an optical fiber preform, the core glass portion including the alkali-metal-doped core glass and the outer core glass and functioning as a core region of an optical fiber, was obtained. The concentration of the alkali metal in the core glass portion was 72 atomic ppm on average. The combination of this outer core glass was performed by a rod-in-collapse method in which a glass pipe composed of silica-based glass doped with 5,000 atomic ppm of Cl was prepared, the alkali-metal-doped core glass rod was inserted into the glass pipe, and the glass pipe and the core glass rod were heated and integrated with each other by an external heat source.

Silica-based glass (cladding glass portion) doped with F and functioning as an optical cladding and a physical cladding was synthesized on the core glass portion to obtain an optical fiber preform. The relative refractive index difference between the core glass portion and the cladding glass portion was about 0.40%. The optical fiber preform was drawn to manufacture an optical fiber including a glass portion having a diameter of 125 µm. In this step, the take up speed for forming the optical fiber during drawing was 2,000 m/min, and a tension applied to the glass portion of the optical fiber was 50 gf (0.49 N). Properties of the optical fiber thus manufactured are shown in Table. An optical fiber having a low attenuation was obtained.

Example 2

In Example 2, an optical fiber preform was manufactured by sequentially performing the processes of steps S1 to S5 and step S7 in FIG. 1, and an optical fiber was further manufactured from the optical fiber preform. Transmission properties of the optical fiber were evaluated.

A glass pipe prepared in step S1 was composed of silica-based glass containing 100 atomic ppm of Cl and 5,000 atomic ppm of F as dopants, and the concentration of other impurities in the glass pipe was 10 atomic ppb or less. Thus, the glass pipe was substantially composed of pure silica glass. The outer diameter of this glass pipe was 25 mm, and the inner diameter thereof was about 10 mm.

In step S2, potassium bromide (KBr) was used as a raw material for an alkali metal, and this raw material was heated to a temperature of 780° C. by a heat source to generate KBr vapor. The glass pipe was then heated by an oxyhydrogen flame serving as an external heat source so that the temperature of the outer surface of the glass pipe became 2,050° C. while the KBr vapor was introduced into the glass pipe together with oxygen introduced as a carrier gas at a flow rate of 1 SLM (1 liter/min in terms of the standard state). Heating was performed by causing the oxyhydrogen flame to traverse at a rate of 30 mm/min for a total of 15 times. Thus, the inner surface of the glass pipe was doped with a potassium metal element by diffusion.

In step S3, the glass pipe doped with the potassium metal element was heated by an oxyhydrogen flame serving as an external heat source so that the temperature of the outer surface of the glass pipe became 2,100° C. while oxygen was supplied through the glass pipe at a flow rate of 2 SLM. Heating was performed by causing the oxyhydrogen flame to traverse at a rate of 40 mm/min for a total of 8 times. Thus, the inner surface of the glass pipe doped with the potassium metal element was doped with oxygen molecules by diffusion. Furthermore, step S4 was performed at the same time as step S3 to reduce the inner diameter of the glass pipe doped with the potassium metal element to 3 mm.

In step S5, gas-phase etching was performed by heating the glass pipe doped with the potassium metal element and oxygen molecules by an external heat source while $SF_6$ (0.05 SLM) and oxygen (1 SLM) were introduced into the glass pipe. Thus, the inner diameter of the glass pipe was made to 3.3 mm. In Example 2, the process of step S6 was not performed.

In step S7, the absolute pressure in the glass pipe was reduced to 1 kPa, while oxygen (1 SLM) was introduced into the glass pipe. The glass pipe was made to collapse by increasing the surface temperature of the glass pipe to 1,400° C. by an external heat source. Thus, an alkali-metal-doped core glass rod having a diameter of 22 mm was obtained. The maximum concentration of oxygen molecules in this core glass rod was 45 mol ppb, and the maximum potassium concentration therein was 800 atomic ppm.

In order to remove water and hydroxyl group and transition metals in the outer peripheral portion of the alkali-metal-doped core glass rod obtained by collapsing, the outer peripheral portion of the core glass rod was ground until the diameter of the core glass rod became 8 mm. Silica-based glass serving as outer core glass and doped with 13,000 atomic ppm of Cl was provided on the outside of the alkali-metal-doped core glass rod to form core glass having a diameter of 30 mm. Specifically, a core glass portion of an optical fiber preform, the core glass portion including the alkali-metal-doped core glass and the outer core glass and functioning as a core region of an optical fiber, was obtained. The concentration of the alkali metal in the core glass portion was 42 atomic ppm on average. The combination of this outer core glass was performed by a rod-in-collapse method in which a glass pipe composed of silica-based glass doped with 13,000 atomic ppm of Cl was prepared, the alkali-metal-doped core glass rod was inserted into the glass pipe, and the glass pipe and the core glass rod were heated and integrated with each other by an external heat source.

Silica-based glass (cladding glass portion) doped with F and functioning as an optical cladding and a physical cladding was synthesized on the core glass portion to obtain an optical fiber preform. In Example 2, the cladding glass portion includes an inner cladding glass portion circumscribed with the core glass portion and an outer cladding glass portion circumscribed with the inner cladding glass portion. The relative refractive index difference between the core glass portion and the inner cladding glass portion was about 0.34%. The relative refractive index difference between the core glass portion and the outer cladding glass portion was about 0.26%. The optical fiber preform was drawn to manufacture an optical fiber including a glass portion having a diameter of 125 µm. In this step, the take up speed for forming the optical fiber during drawing was 2,000 m/min, and a tension applied to the glass portion of the optical fiber was 50 gf (0.49 N). Properties of the optical fiber thus manufactured are shown in Table. An optical fiber having a low attenuation was obtained.

Example 3

In Example 3, an optical fiber preform was manufactured by sequentially performing the processes of steps S1 to S5 and step S7 in FIG. 1, and an optical fiber was further manufactured from the optical fiber preform. Transmission properties of the optical fiber were evaluated. In Example 3, in the collapsing step of step S7, the partial pressure of oxygen in a glass pipe was increased to 80 kPa or more.

A glass pipe prepared in step S1 was composed of silica-based glass containing 250 atomic ppm of Cl and 4,000 atomic ppm of F as dopants, and the concentration of other impurities in the glass pipe was 10 atomic ppb or less. Thus, the glass pipe was substantially composed of pure silica glass. The outer diameter of this glass pipe was 30 mm, and the inner diameter thereof was about 15 mm.

In step S2, potassium bromide (KBr) was used as a raw material for an alkali metal, and this raw material was heated to a temperature of 840° C. by a heat source to generate KBr vapor. The glass pipe was then heated by an oxyhydrogen flame serving as an external heat source so that the temperature of the outer surface of the glass pipe became 2,100° C. while the KBr vapor was introduced into the glass pipe together with oxygen introduced as a carrier gas at a flow rate of 1 SLM (1 liter/min in terms of the standard state). Heating was performed by causing the oxyhydrogen flame to traverse at a rate of 30 mm/min for a total of 20 times. Thus, the inner surface of the glass pipe was doped with a potassium metal element by diffusion.

In step S3, the glass pipe doped with the potassium metal element was heated by an oxyhydrogen flame serving as an external heat source so that the temperature of the outer surface of the glass pipe became 2,100° C. while oxygen was supplied through the glass pipe at a flow rate of 2 SLM. Heating was performed by causing the oxyhydrogen flame to traverse at a rate of 40 mm/min for a total of 8 times. Thus, the inner surface of the glass pipe doped with the potassium metal element was doped with oxygen molecules by diffusion. Furthermore, step S4 was performed at the same time as step S3 to reduce the inner diameter of the glass pipe doped with the potassium metal element to 3 mm.

In step S5, gas-phase etching was performed by heating the glass pipe doped with the potassium metal element and oxygen molecules by an external heat source while $SF_6$ (0.05 SLM) and oxygen (1 SLM) were introduced into the glass pipe. Thus, the inner diameter of the glass pipe was made to 3.4 mm. In Example 3, the process of step S6 was not performed.

In step S7, the absolute pressure in the glass pipe was controlled to be 95 kPa, while oxygen (1 SLM) was introduced into the glass pipe. Accordingly, the partial pressure of oxygen in the glass pipe was 95 kPa. The glass pipe was made to collapse by increasing the surface temperature of the glass pipe to 1,700° C. by an external heat source. Thus, an alkali-metal-doped core glass rod having a diameter of 26 mm was obtained. The maximum concentration of oxygen molecules in this core glass rod was 110 mol ppb, and the maximum potassium concentration therein was 3,000 atomic ppm.

The alkali-metal-doped core glass rod obtained by collapsing was drawn by a known method so that the diameter thereof became 20 mm. Subsequently, in order to remove water and hydroxyl-group and transition metals in the outer peripheral portion of the alkali-metal-doped core glass rod, the outer peripheral portion of the core glass rod was ground until the diameter of the core glass rod became 12 mm. Silica-based glass serving as outer core glass and doped with 10,000 atomic ppm of Cl was provided on the outside of the alkali-metal-doped core glass rod to form core glass having a diameter of 60 mm. Specifically, a core glass portion of an optical fiber preform, the core glass portion including the alkali-metal-doped core glass and the outer core glass and functioning as a core region of an optical fiber, was obtained. The concentration of the alkali metal in the core glass portion was 120 atomic ppm on average. The combination of this outer core glass was performed by a rod-in-collapse method in which a glass pipe composed of silica-based glass doped with 10,000 atomic ppm of Cl was prepared, the alkali-metal-doped core glass rod was inserted into the glass pipe, and the glass pipe and the core glass rod were heated and integrated with each other by an external heat source.

Silica-based glass (cladding glass portion) doped with F and functioning as an optical cladding and a physical cladding was synthesized on the core glass portion to obtain an optical fiber preform. In Example 3, the cladding glass portion includes an inner cladding glass portion circumscribed with the core glass portion and an outer cladding glass portion circumscribed with the inner cladding glass portion. The relative refractive index difference between the core glass portion and the inner cladding glass portion was about 0.35%. The relative refractive index difference between the core glass portion and the outer cladding glass portion was about 0.33%. The optical fiber preform was drawn to manufacture an optical fiber including a glass portion having a diameter of 125 µm. In this step, the take up speed for forming the optical fiber during drawing was 2,300 m/min, and a tension applied to the glass portion of the optical fiber was 40 gf (0.39 N). Properties of the optical fiber thus manufactured are shown in Table. An optical fiber having a low attenuation was obtained.

What is claimed is:

1. An optical fiber preform composed of silica-based glass, the optical fiber preform comprising:
   a core portion to be formed into a core region of an optical fiber by drawing,
   wherein the core portion includes an alkali-metal-doped core glass portion doped with one or more alkali metals,
   wherein at least a portion of the core portion contains oxygen molecules having a concentration of 30 mol ppb or more, and
   the average concentration of alkali metal in the core portion is 5 atomic ppm or more,
   wherein the maximum concentration of oxygen molecules in the alkali-metal-doped core glass portion is 160 mol ppb or less.

2. The optical fiber preform according to claim 1,
   wherein the alkali-metal-doped core glass portion contains a halogen in addition to a $SiO_2$ glass network,
   the average concentration of each of germanium and phosphorous in the alkali-metal-doped core glass portion is lower than the average concentration of each of the alkali metal and the halogen in the alkali-metal-doped core glass portion.

3. The optical fiber preform according to claim 2,
   wherein the maximum concentration of each of germanium and phosphorous in the alkali-metal-doped core glass portion is lower than the maximum concentration of each of the alkali metal, the oxygen molecules, and the halogen in the alkali-metal-doped core glass portion.

4. The optical fiber preform according to claim 1, further comprising:
a cladding portion to be formed into a cladding region of the optical fiber by drawing, the cladding portion being disposed on the periphery of the core portion,
wherein the cladding portion is silica-based glass doped with fluorine.

5. The optical fiber preform according to claim 1,
wherein the alkali-metal-doped core glass portion is silica-based glass doped with potassium as the one or more alkali metals.

6. The optical fiber preform according to claim 1,
wherein the core portion includes a first core glass portion doped with the one or more alkali metals in an average concentration of 5 atomic ppm or more, and a second core glass portion containing the one or more alkali metals in an amount of 1 atomic ppm or less, the second core glass portion being disposed on the outer periphery of the first core glass portion.

7. The optical fiber preform according to claim 1,
wherein the average concentration of the alkali metal in the core portion is 120 atomic ppm or less.

8. An optical fiber manufactured by drawing the optical fiber preform according to claim 1, wherein an attenuation at a wavelength of 1,550 nm is 0.180 dB/km or less.

9. A method of manufacturing an optical fiber preform composed of silica-based glass and including a core portion to be formed into a core region of an optical fiber by drawing, the method comprising:
an alkali-metal-doping step of doping a glass pipe composed of silica-based glass with one or more alkali metals by heating the glass pipe while supplying source gas of the one or more alkali metals to the inside of the glass pipe;
an oxygen-molecule-doping step of doping the glass pipe with oxygen molecules by heating the glass pipe while supplying oxygen gas to the inside of the glass pipe; and
a collapsing step of collapsing the glass pipe by heating the glass pipe after the alkali-metal-doping step and the oxygen-molecule-doping step,
wherein the optical fiber preform according to claim 1 is manufactured.

10. The method according to claim 9,
wherein, in the collapsing step, the partial pressure of the oxygen gas in the glass pipe is controlled to be 80 kPa or more.

* * * * *